United States Patent [19]

Mead et al.

[11] 4,229,661
[45] Oct. 21, 1980

[54] POWER PLANT FOR CAMPING TRAILER

[76] Inventors: Claude F. Mead, 5072 Mt. Etna Dr., San Diego, Calif. 92117; William F. Holmes, 5515 Shasta La. #1, La Mesa, Calif. 92041

[21] Appl. No.: 13,044

[22] Filed: Feb. 21, 1979

[51] Int. Cl.³ .............................................. F03D 9/02
[52] U.S. Cl. ............................... 290/44; 290/52; 290/55
[58] Field of Search ......................... 290/1, 44, 52, 55

[56] References Cited

U.S. PATENT DOCUMENTS

| | | | |
|---|---|---|---|
| 2,230,526 | 2/1941 | Claytor | 290/44 |
| 2,539,862 | 1/1951 | Rushing | 290/44 X |
| 3,315,085 | 4/1967 | Mileti et al. | 290/55 X |
| 3,546,474 | 12/1979 | DeCourcy et al. | 290/1 X |
| 4,150,300 | 4/1979 | VanWinkle | 290/55 X |

*Primary Examiner*—J. V. Truhe
*Assistant Examiner*—W. E. Duncanson, Jr.
*Attorney, Agent, or Firm*—Henri J. A. Charmasson

[57] ABSTRACT

A power plant for mobile homes, camping trailers, and the like, capable of capturing low powered aeolian energy, storing said energy in the form of compressed air, and delivering it on demand in the form of household electrical current. The device comprises a wind turbine driving an air compressor which feeds a storage tank. On demand, the compressed air drives a turbine coupled to an electrical generator. Various pressure regulators are used to regulate the speed of the generator. The wind turbine is also coupled to an alternator which maintains a bank of electrical batteries charged. A DC motor running on the batteries is used when necessary to boost the drive of the air compressor during periods of heavy or long power drain. Provision is made for rapidly recharging the power plant from either a supply of compressed air or from an AC power source.

10 Claims, 4 Drawing Figures

POWER PLANT FOR CAMPING TRAILER

BACKGROUND OF THE INVENTION

The current shortage of fossil fuel and public concern for the quality of the environment have triggered a hurried search for alternate forms of energy. The capture and use of solar energy, and its derivative, wind power, is the object of many new inventions. Due to the inefficiency of the collector device and storage media, use of these forms of energy has been limited to low power stationery applications. Yet wind power should be adequate for any application requiring very low power or a short, occasional low to medium power supply of energy. These circumstances are encountered, for instance, in a refrigerated railroad car where occasional bursts of power are required to run the refrigerating system in order to maintain a low temperature inside the car. Similar circumstances are found in some mobile housing units such as a camping trailer. There, again, a supply of household current might be necessary for a short time between long periods of travel. In such instances, a system can be devised for accumulating energy generated by a wind turbine powered by the wind or by the air draft created by the motion of the vehicle. It is further desirable that the power system be replenishable from non-polluting energy sources which can be encountered along the travel route.

SUMMARY OF THE INVENTION

It is accordingly an object of the instant invention to provide a novel power plant for mobile homes, and the like, which captures aeolian energy, stores it in the form of compressed air, and delivers it on demand in the form of household electrical current.

Another object of this invention is to provide a power plant which does not discharge polluting effluents into the atmosphere.

Still another object of the invention is to provide a power plant which can be recharged by capturing the effect of the wind, or the effect of the air draft created by the movement of the vehicle.

A further object of the invention is to provide a power plant which can be recharged from a household current electrical outlet.

It is also an object of this invention to provide a power plant which can be replenished from a source of compressed air such as those found in automotive service stations.

An additional object of the invention is to provide a power plant which is responsive to a very low level of aeolian energy for a short period of time.

These and other objects are achieved by a power plant which comprises a wind turbine driving an air compressor. Theair supply by the compressor is stored in the tank and used on demand to activate a turbine. The turbine, in turn, is coupled to a generator which creates household current. The wind turbine is also coupled to generators which charge a series of electrical batteries. On occasions when the AC power drain requires it, a motor running on the batteries is used to boost the output of the air compressor. Provision is made for driving the compressor from an outside AC power source. The air tank has a separate inlet through which it can be replenished from a source of compressed air.

IN TTHE DRAWINGS

DESCRIPTION OF THE PREFERRED EMBODIMENT OF THE INVENTION

Figure 1:
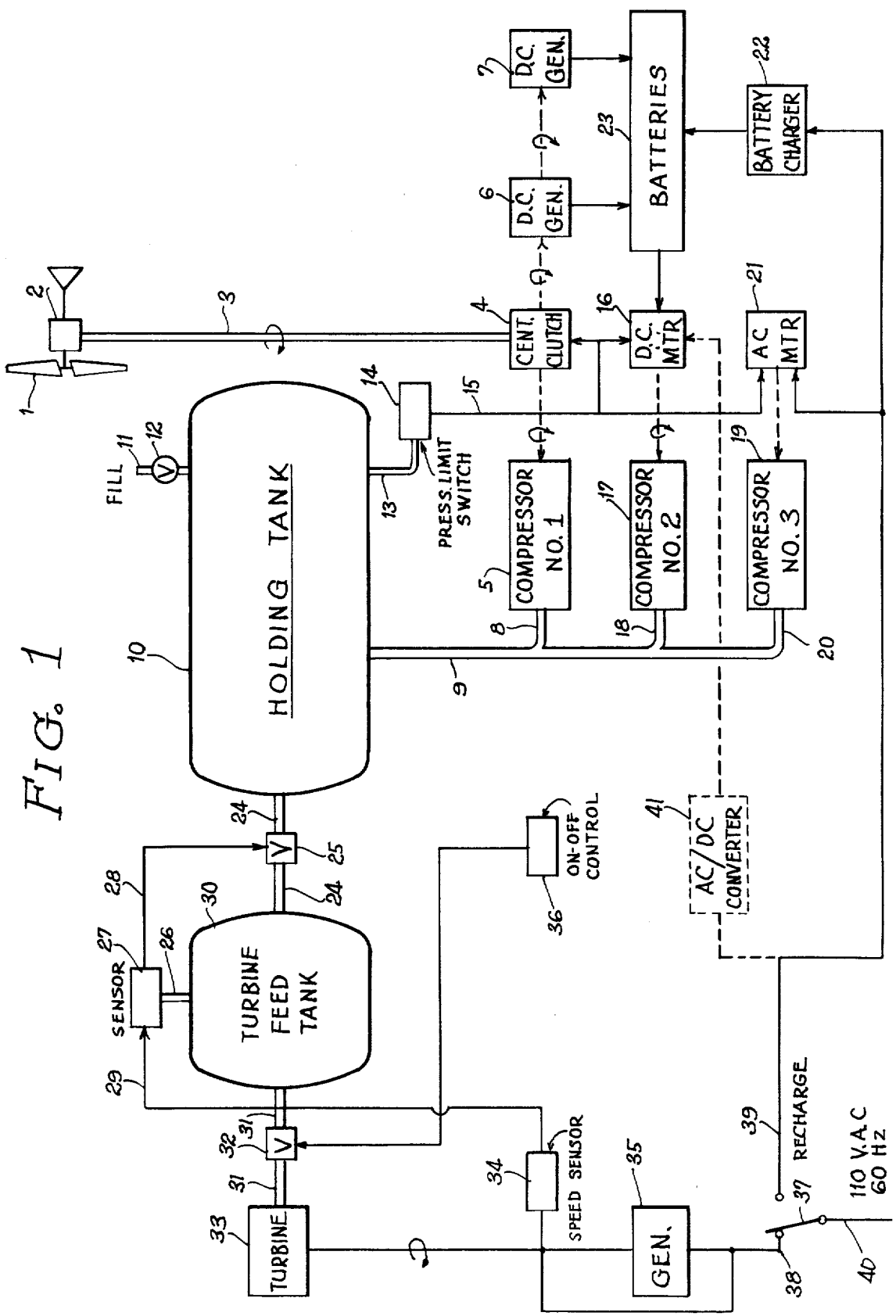
FIG. 1 is the general block diagram of the entire power plant.

Referring now to FIG. 1, there is shown a diagramatical representation of the preferred embodiment of the invention. A wind turbine comprising a propeller 1 and an orthogonal coupling assembly 2 drives a shaft 3 connected to a centrifugal clutch 4. This type of clutch is designed to engage itself when the speed of the drive shaft 3 reaches a certain minimum preset limit. The plate of the clutch is first connected to a compressor number 5 and second to a couple of DC generators 6 and 7. Block 5 represents a adiabatic compressor requiring an input drive of approximately one-fourth horsepower. The output of the compressors 5 is protected by a check valve and leads into a pipe 8 connected to a tank inlet pipe 9. The inlet pipe 9 feeds into a holding tank 10 capable of holding sixty gallons of compressed air under a maximum pressure of 200 pounds per square inch. The DC generators 6 and 7 supply a series of electrical batteries 23. The batteries feed a DC motor 16. The DC motor is in turn connected to a second compressor 17. The second compressor 17 is similar to the first compressor 5 and is connected through to pipe 18 to the tank inlet pipe 9. A third compressor 19 similar to the first and second compressors is also connected to the tank inlet pipe 9 through pipe 20. The third compressor 19 is powered by an AC motor 21. A pressure limit switch assembly 14 senses the pressure in the holding tank through a pipe 13. A high pressure switch within the assembly 14 is activated when the holding tank reaches the maximum safely allowable pressure. This switch through line 15 causes the disengagement of the clutch 4 and turns off DC motor 16 and AC motor 21. A second switch within the assembly 14 is activated when the holding pressure falls below a preset limit.

This second switch through line 15 turns on the DC motor 16. It can now be seen that when the tank pressure is below the lowest limit, both the first and second compressors 15, 17 will be activated. When the tank pressure goes above the lowest preset limit, only the first compressor 5 will be activated. If the holding tank pressure reaches the maximum tolerable limit all the compressors will be deactivated. The engagement speed of the centrifugal clutch 4 is set to a level corresponding to the minimum power necessary to drive the first compressor 5 and the DC generators 6 and 7. If the speed of the wind falls below that level, the shaft 3 will be free-running. The holding tank 10 has a separate inlet 11 protected by a check valve 12. The holding tank is connected to a turbine feed tank 30 through pipe 24 controlled by valve 25. The turbine feed tank 30 is connected to the inlet of a turbine 33 through pipe 31 controlled by valve 32. The turbine 33 is powered by the expansion of the compressed air supplied by the turbine feed tank 30. The turbine 33 is similar to the compressed air motors used in certain impactors and drills. The turbine drives an AC generator 35 designed to supply approximately five kilo volt amperes of household current at 60 Hertz and 110 volts. The turbine is turned on by means of the valve 32 controlled by an/off switch 36. The speed of the turbine 33 is determined by the pressure of the air accumulated in the turbine tank 30. The pressure is monitored by sensor 27 connected to the turbine feed tank 30 by pipe 26. Sensor 27 contains a set of high and low limits. When the turbine feed tank pressure falls below the low limit, valve 25 is opened through control line 28. When the pressure in the turbine feed tank 30 reaches the high limit, the valve 25 is closed. The high and low limit of sensors 27 are not fixed but subject to minor variations in response to the speed of the turbine 33. The speed of the turbine 33 and of the generator 35 is monitored by speed sensor 34. The output of the speed sensor 34 is inversely proportional to the speed of the turbine 33. The speed sensor signal 29 is fed to sensor 27. if the output frequency of the generator 35 deviates from the required 60 Hertz, the high and low limits of the sensor 27 are either increased or decreased. If the speed of the generator is slowed down by an increase in the load current, the high and low limits of sensor 27 are raised in order to raise the pressure in turbine feed tank 30. The turbine 33 will respond to the pressure change by increasing its rotational speed. The output of the generator 35 is made available for use through lines 38 and 40 controlled by a switch 37. The pressure in the holding tank 10 may be boosted from two external sources. First, compressed air may be introduced through inlet 11. Second, the AC motor 21 may be connected to an external source of electrical energy through lines 39 and 40 controlled by switch 37. The external electrical source may also be applied to a battery charger 22 which supplies the series of batteries 23. In an alternate version of the preferred embodiment, it is suggested that an AC/DC converter 41 be used to drive the DC motor 16 from the external electrical supply. In such a case, the AC motor 23 and the third compressor 19 are not necessary. The power plant just described is primarily designed to be installed on board a camping trailer. This power plant will accumulate aeolian energy during the periods when the wind is blowing or the trailer is in motion. The energy is stored in two forms. First, it is stored in the form of compressed air in the holding tank 10. Second, it is stored in the form of DC current in the series of batteries 23. Both storage media are ecologically clean. Furthermore, the electrical system can boost the power of the compressed air system during periods of heavy power drain or long use. For added convenience, the system can be refueled from an external source of electrical energy such as a household outlet or from an external source of compressed air such as those found in service stations for use by automobilists. It should be noted also that this power plant is versatile in that it can be driven not only from the movement of fluids such as air or water, but also from the movement of the vehicle. In the later case, the shaft 3 would be coupled directly to the wheel of the vehicle.

Figure 2:
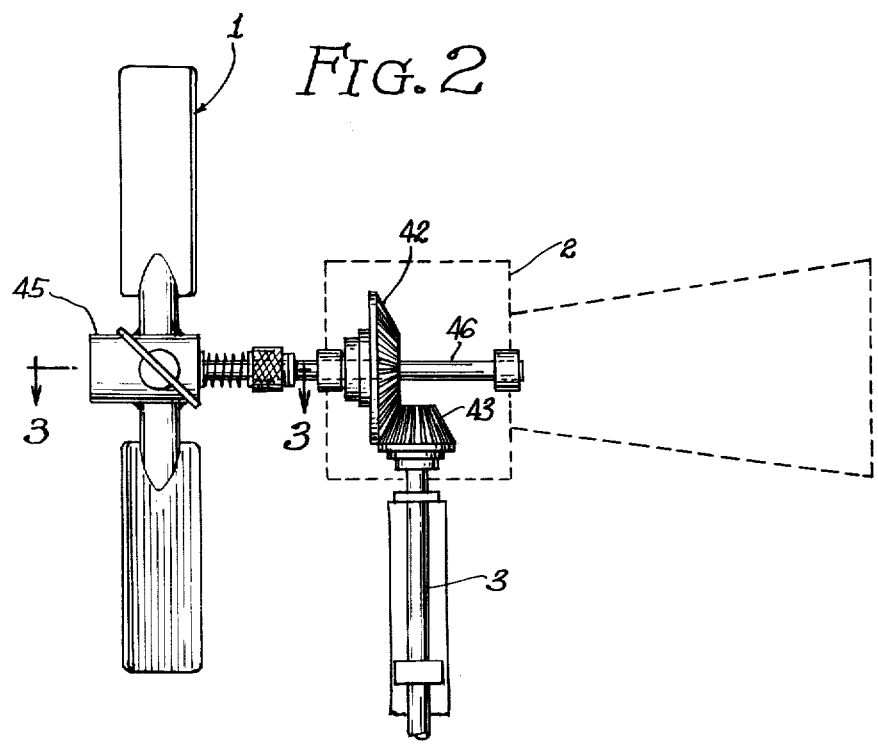
FIG. 2 is a front elevation of the wind turbine and of its mechanical coupling to the drive shaft.
Figure 3:
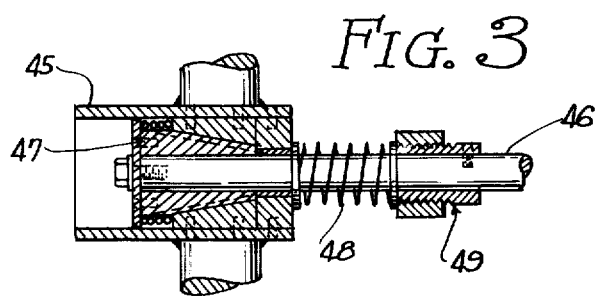
FIG. 3 is a cross-sectional view taken along line 3—3 of FIG. 2 showing the propeller linkage mechanism in the engaged position.
Figure 4:
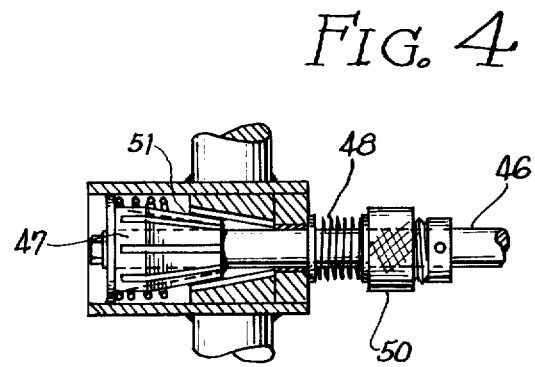
FIG. 4 is a view similar to the one illustrated in FIG. 3 but showing the propeller linkage mechanism in the disengaged position.

Referring now to FIGS. 2 through 4, there is shown the details of the propeller 1 and coupling box 2. The propeller is noticeable by the fact that it is protected against bursts of wind which could damage the equipment. The hub 45 of propeller 1 is mounted on a shaft 46 by means of a conical spindle 46. The hub has a central cavity 51 matching the outline of the spindle 47. The hub 45 is held against the spindle by means of a coil spring 48 resting against an adjustable stop 49. An excess of pressure of the wind against the propeller 1 will cause the hub 45 to be pulled back against the spring 48, disengaging it from the spindle 47. At that point the propeller 1 will rotate freely without driving the shaft 46. The pressure of the coil spring 48 may be adjusted by turning the ring 50 around the threaded base of the stop 49.

The various mechanical and electro-mechanical components of the power plant such as the centrifugal clutch, compressors, generators, turbines, valves and pressure-activated switches are well known to those skilled in the art.

The speed sensor 34 may be implemented with an electronic integrator whose output signal 29 amplitude is proportional to the frequency of AC generator 35. The signal 29 is then used to modulate the sensitivity of sensor 27 switches. This technique is also well known to those skilled in the electro-mechanical arts.

Modifications, other than those suggested, can be made to the embodiment of the invention just described without departing from the spirit of the invention and the scope of the appended claims.

The invention claimed is:

1. A power plant which comprises:
   (a) first rotating means responsive to movement of a fluid;
   (b) first fluid compressor driven by the first rotating means;
   (c) first means for coupling the first rotating means to the first fluid compressor;
   (d) first electrical energy generator driven by the first rotating means;
   (e) second means for coupling the first rotating means to the first generator;
   (f) means for accumulating electrical energy generated by the first generator;
   (g) second rotating means responsive to said accumulated energy;
   (h) second fluid compressor driven by the second rotating means;
   (i) means for storing compressed fluid;
   (j) fluid conduit means for connecting the outputs of the first and second fluid compressors to the means for storing;
   (k) means responsive to fluid pressure within the means for storing for controlling the operation of the first and second fluid compressors;
   (l) third rotating means responsive to the expansion of compressed fluid;
   (m) means for connecting the means for storing to the third rotating means;
   (n) second electrical energy generator driven by third rotating means; and
   (o) means for coupling the third rotating means to the second electrical energy generator.

2. The power plant claimed in claim 1 wherein the means for controlling the operation of the first and second fluid compressors comprise:
   (a) first switch means responsive to high pressure for turning off the second rotating means and for inhibiting the first fluid compressor; and
   (b) second switch means responsive to lower pressure for turning on the second rotating means.

3. The power plant claimed in claim 2 wherein the means for storing compressed fluid comprise:

(a) a high pressure tank;
(b) a low pressure tank;
(c) first valve means responsive to fluid pressure in the low pressure tank for regulating the flow of fluid from the high pressure tank to the low pressure tank; and
(d) the means for connecting the means for storing to the third rotating means comprise fluid conduit means and second valve means for controlling the flow of fluid.

4. The power plant claimed in claim 3 wherein said means for storing further comprise means responsive to the rotating speed of the third rotating means for controlling the first valve means.

5. The power plant claimed in claim 4 which further comprises:
(a) fourth rotating means responsive to electrical energy;
(b) third fluid compressor driven by the fourth rotating means;
(c) means for coupling the fourth rotating means to the third fluid compressor;
(d) means for connecting the third fluid compressor to the means for storing; and
(e) means for connecting the fourth rotating means to an external electrical energy source.

6. The power plant claimed in claim 4 wherein said means for accumulating comprise at least one electrical storage battery;
a battery charger connected to said battery; and
means for connecting said battery to an external electrical power source.

7. The power plant claimed in claim 1 wherein said first rotating means comprise: Lp1 (a) a rotating shaft;
(b) a conical spindle at one end of the shaft;
(c) a propeller having in its hub a conical hole engaging said spindle;
(d) means for resiliently holding the propeller engaged around said spindle; and
(e) means for adjusting the pressure of the means for holding against the propeller.

8. The power plant claimed in claim 4 wherein the first means for coupling comprise a centrifugal clutch.

9. The power plant claimed in claim 7 installed into a vehicle.

10. The power plant claimed in claim 9 wherein said high pressure tank comprises a means for connecting said tank to an outside source of compressed air;
said means for accumulating electrical energy comprises at least one electrical storage battery;
said second rotating means comprise a DC motor;
said third rotating means comprise a turbine powered by expansion of compressed air;
said second electrical energy generator comprise a generator of household alternating current; and
means for distributing said household current to the vehicle electrical appliances.

* * * * *